United States Patent
Eggen et al.

(10) Patent No.: US 10,171,300 B2
(45) Date of Patent: Jan. 1, 2019

(54) AUTOMATIC REDISTRIBUTION OF VIRTUAL MACHINES AS A GROWING NEURAL GAS

(71) Applicant: International Business Machines Corporation, Armonk, NY (US)

(72) Inventors: Bertus Eggen, Cologne (DE); John F. Hollingsworth, Wynnewood, PA (US); Baiju D. Mandalia, Boca Raton, FL (US); Philip D. Tetlow, Cleveland (GB)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 14/929,531

(22) Filed: Nov. 2, 2015

(65) Prior Publication Data

US 2017/0126500 A1 May 4, 2017

(51) Int. Cl.
*H04L 12/24* (2006.01)
*H04L 12/26* (2006.01)

(52) U.S. Cl.
CPC ...... *H04L 41/0823* (2013.01); *H04L 41/0816* (2013.01); *H04L 41/0896* (2013.01);
(Continued)

(58) Field of Classification Search
CPC ............. H04L 41/0816; H04L 41/0823; H04L 41/0896; H04L 41/12; H04L 41/145; H04L 41/16; H04L 43/0817; H04L 43/0876
See application file for complete search history.

(56) References Cited

U.S. PATENT DOCUMENTS

| 8,352,392 | B2 * | 1/2013 | Swift | H04L 41/145 |
| | | | | 706/21 |
| 2009/0138420 | A1 * | 5/2009 | Swift | H04L 41/147 |
| | | | | 706/21 |

(Continued)

FOREIGN PATENT DOCUMENTS

WO WO2014002102 1/2014

OTHER PUBLICATIONS

Calculate Optimal Placement of Cloud Groups into Expert Integrated Systems, ip.com IP.com No. 000236022; IP.com Electronic Publication: Apr. 2, 2014, 4 pages.
(Continued)

*Primary Examiner* — June Y Sison
(74) *Attorney, Agent, or Firm* — Schmeiser, Olsen & Watts, LLP; Michael Petrocelli

(57) ABSTRACT

A method and associated systems for automatic redistribution of virtual machines. A cloud-optimization module selects parameters, such as bandwidth requirements, that characterize an efficiency of a virtual network. It assigns weightings to these parameters based on relative importance of each parameter to the proper operation of the network, where the weightings may be determined as functions of captured network-performance statistics. The module translates the network's topology into a graph in which each node represents a network entity, such as a virtual machine or an application, and each edge represents a connection between two such entities. The module then uses a growing neural gas algorithm to revise the graph and the weightings, and translates the revised graph to a more optimal topology that has redistributed the network entities to operate more efficiently, as measured by the weighted parameters.

16 Claims, 4 Drawing Sheets

(52) U.S. Cl.
CPC ............ *H04L 41/12* (2013.01); *H04L 41/145* (2013.01); *H04L 41/16* (2013.01); *H04L 43/0817* (2013.01); *H04L 43/0876* (2013.01)

(56) References Cited

U.S. PATENT DOCUMENTS

| | | |
|---|---|---|
| 2012/0030335 A1 | 2/2012 | Machida et al. |
| 2012/0036251 A1 | 2/2012 | Beaty et al. |
| 2012/0191857 A1 | 7/2012 | Doorhy et al. |
| 2012/0254860 A1 | 10/2012 | Bozek et al. |
| 2012/0297236 A1 | 11/2012 | Ziskind et al. |
| 2013/0055251 A1 | 2/2013 | Anderson et al. |
| 2013/0275977 A1 | 10/2013 | Uyeda et al. |
| 2013/0290953 A1 | 10/2013 | Li et al. |
| 2014/0059380 A1 | 2/2014 | Krishnan et al. |
| 2014/0059392 A1 | 2/2014 | Ren et al. |
| 2014/0317622 A1 | 10/2014 | Hegdal et al. |
| 2014/0344440 A1 | 11/2014 | Dutta et al. |
| 2015/0245160 A1* | 8/2015 | Agrawal ............... H04W 4/001 455/406 |

OTHER PUBLICATIONS

Simple Calibration of Conflicting Goals in Cloud Optimization, ip.com, IP.com No. 000237745, IP.com Electronic Publication: Jul. 9, 2014, 11 pages.

Method to optimize cloud delivery services, by recommending best-fit virtual machine image, to enhance user experience, ip.com, IP.com No. 000225113, IP.com Electronic Publication: Jan. 24, 2013, 11 pages.

Chen et al., A Profit-aware Virtual Machine Development Optimization Framework for Cloud Platform Providers, 2012 IEEE Fifth International Conference on Cloud Computing, pp. 17-24.

Bernd Fritzke, A Growing Neural Gas Network Learns Topologies, Advances in Neural Information Provessing Systems 7, MIT Press. Cambridge, MA 1995, 8 pages.

\* cited by examiner

AUTOMATIC REDISTRIBUTION OF VIRTUAL MACHINES AS A GROWING NEURAL GAS

TECHNICAL FIELD

The present invention relates to optimizing virtual resources of a cloud-computing environment. In particular, it relates to automatic redistribution of virtual machines within a cloud environment.

BACKGROUND

A virtualized cloud-computing environment may host many thousands of virtual components, such as virtual desktop computers, servers, peripherals, network buses, and other infrastructure components. These components, and software applications that run on them, may consume different amounts of network resources, and these amounts may change rapidly over time.

It is thus possible that one subset of virtual components and applications may consume far more bandwidth and other resources than does another subset, even if the two subsets contain similar numbers of components. Furthermore, such imbalances may be transient, existing only so long as a particular combination of users, applications, or other dynamic requirements exist in a particular configuration.

Such virtualized computing environments could thus be optimized by a mechanism that identifies such imbalances and automatically reconfigures components so as to more evenly distribute workloads.

Many network-optimization tools exist, but none actively monitor utilization of cloud resources and dynamically reconfigure that cloud's topology as a function of the monitored usage characteristics.

Similar constraints prevent system administrators from dynamically optimizing other types of virtualized computing environments.

BRIEF SUMMARY

A first embodiment of the present invention provides a cloud-optimization module comprising a processor, a memory coupled to the processor, a computer-readable hardware storage device coupled to the processor, a network monitor, and an interface to a network-administration mechanism, the storage device containing program code configured to be run by the processor via the memory to implement a method for automatic redistribution of a set of virtual components of a virtual network of a virtual network, the method comprising:

the cloud-optimization module selecting a set of network parameters, wherein each parameter of the set of network parameters identifies one or more performance characteristics of the virtual network;

the cloud-optimization module representing a current topology of the virtual network as a graph, wherein the graph represents a component of the virtual network as a node and a connection between two components of the virtual network as an edge connecting two nodes that represent the two components;

the processor receiving from the network monitor information that identifies a set of network-utilization figures, wherein each figure of the set of network-utilization figures identifies an amount of network resources used by one component of the set of virtual components;

the cloud-optimization module associating a weighting with each parameter of the set of network parameters as a function of the received network-utilization figures; and the processor optimizing the virtual network as a function of the weighted parameters and the current utilization information.

A second embodiment of the present invention provides a method for automatic redistribution of a set of virtual components of a virtual network of a virtual network, the method comprising:

a cloud-optimization module selecting a set of network parameters, wherein each parameter of the set of network parameters identifies one or more performance characteristics of the virtual network;

the module representing a current topology of the virtual network as a graph, wherein the graph represents a component of the virtual network as a node and a connection between two components of the virtual network as an edge connecting two nodes that represent the two components;

the processor receiving from the network monitor information that identifies a set of network-utilization figures, wherein each figure of the set of network-utilization figures identifies an amount of network resources used by one component of the set of virtual components;

the module associating a weighting with each parameter of the set of network parameters as a function of the received network-utilization figures; and the processor optimizing the virtual network as a function of the weighted parameters and the current utilization information.

A third embodiment of the present invention provides a computer program product, comprising a computer-readable hardware storage device having a computer-readable program code stored therein, the program code configured to be executed by a cloud-optimization module comprising a processor, a memory coupled to the processor, a computer-readable hardware storage device coupled to the processor, a network monitor, and an interface to a network-administration mechanism, the storage device containing program code configured to be run by the processor via the memory to implement a method for automatic redistribution of a set of virtual components of a virtual network of a virtual network, the method comprising:

the cloud-optimization module selecting a set of network parameters, wherein each parameter of the set of network parameters identifies one or more performance characteristics of the virtual network;

the module representing a current topology of the virtual network as a graph, wherein the graph represents a component of the virtual network as a node and a connection between two components of the virtual network as an edge connecting two nodes that represent the two components;

the processor receiving from the network monitor information that identifies a set of network-utilization figures, wherein each figure of the set of network-utilization figures identifies an amount of network resources used by one component of the set of virtual components;

the module associating a weighting with each parameter of the set of network parameters as a function of the received network-utilization figures; and the processor optimizing the virtual network as a function of the weighted parameters and the current utilization information.

DETAILED DESCRIPTION

Figure 1:
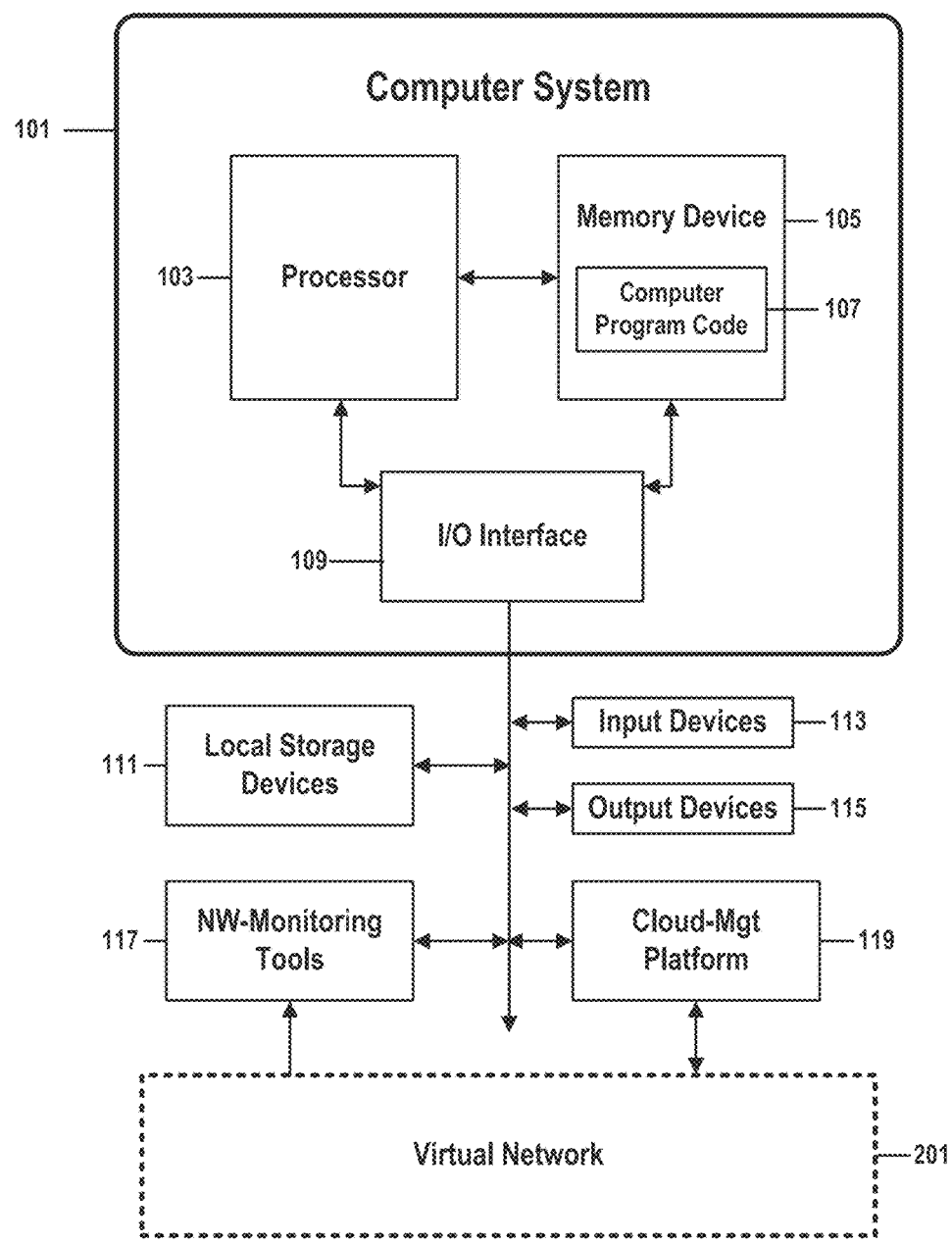
FIG. 1 shows a structure of a computerized system and computer program code that may be used to implement a method for automatic redistribution of virtual machines in accordance with embodiments of the present invention.

Embodiments of the present invention detect an out-of-specification condition of a virtual network, such as communications bandwidth bottleneck, and automatically respond by determining a more optimized topology of the network and then forwarding that new topology to a network-management facility, which redeploys virtualized resources in that new topology. Such embodiments perform this task by selecting parameters by which the out-of-specification condition may be identified, assigning weighting to those parameters as a function of characteristics of the network or of other implementation-dependent details, translating the existing network topology into a graph that may be optimized by known means such as a growing neural gas algorithm, and then translating the optimized graph into a form that may be understood as a topology by the network-management facility.

Some embodiments employ a "growing neural gas" (GNG) algorithm to automatically redistribute servers, or other network resource consumers, as a function of network bandwidth utilization. Such embodiments may also allow input parameters upon which the GNG algorithm operates to be weighted as a function of historic network utilization data and as a further function of the most recently recorded sets of such utilization data.

Unlike conventional load-balancing, topology optimization, and server-redistribution methods, however, the present invention's GNG-based balancing redistribution is not performed as a function of a utilization, capacity, or configuration of server CPU, memory, secondary storage, or other resource not directly related to network bandwidth utilization.

A virtualized computing environment, such as a cloud-computing environment or other type of virtualized platform, may host many thousands of virtual components and software applications distributed across a hierarchical virtual infrastructure. This infrastructure may, for example, organize components into two or more large "regions," each of which may span multiple virtual "locations." In some implementations each virtual machine deployed at a location may be further associated with a "point of delivery" or "POD."

In a normal operation of such a computing environment, virtual components deployed in a single POD, location, region, or other division may draw network resources from a same physical network backbone or bus. Thus, if a larger number of virtual components associated with a single POD, location, region, or other division require a greater-than-average amount of bandwidth, then the physical resources that provide that network bandwidth may at least occasionally be overwhelmed by demand. Even brief spikes of such high demand may compromise response time or an other performance characteristic of all components deployed on that division.

Existing network-optimization tools do not adequately address such performance bottlenecks. Most are limited to selecting which division of a cloud environment in which to deploy a new virtual machine or application and do not attempt to analyze or optimize an existing cloud topology at other times.

Existing tools also do not consider current or historical patterns of bandwidth consumption during a network analysis, focusing instead on parameters such as CPU, memory, or storage utilization of specific virtual or physical components. Nor do they take into account variable bandwidth requirements of deployed or planned software applications.

If, for example, fifty virtual machines running seven major applications are deployed on a single POD, which is hosted by a single server, an existing cloud-management tool might consider the CPU and memory utilization of that server and the amount of local storage available to that server when determining whether to add another virtual machine to the same POD.

The cloud-management tool would not, however, be able to determine that, if the components or applications currently deployed on the POD consume an excessive amount of network bandwidth, these demands may be normalized by adjusting the topologies of a subset of the cloud environment that includes the POD.

Embodiments of the present invention address these issues by revising such topologies so as to more evenly distribute workloads among physical network resource. This optimization method may be performed in response to imbalances identified current workloads and demands of the cloud, or as functions of historical imbalances identified in the past that may be used to infer a likelihood of a future imbalance.

The present invention incorporates an implementation of "growing neural gas" (or "GNG") algorithm to revise such topologies. GNG algorithms are known in the art as a method of reorganizing a topology of a graph in order to more evenly distribute nodes. GNG methods are adapted here to a cloud topology by representing the cloud as a graph, with each node representing a virtual component and each edge representing a network connection between two virtual components.

A detailed description of a standard operation of a growing neural gas algorithm, as is known in the art, is found in cited reference:

Bernd Fritzke, A Growing Neural Gas Network Learns Topologies, *Advances in Neural Information Processing Systems* 7, 625-632, MIT Press (1995) (available at: http://papers.nips.cc/paper/893-a-growing-neural-gas-network-learns-topologies.pdf).

Such an algorithm is known as a growing neural gas algorithm because it operates upon a graph that represents a set of neural connections; and because, as it is performed iteratively upon such a graph, it reorganizes the nodes (creating new edges to connect nodes in different ways) to smooth out regions of greater or lower "density"—much like the way a compressed gas would become more homogenous when expanding into a larger space.

Growing neural gas algorithms are often used in applications in which data compression must occur, most often when an application comprises data-compression based on a technique of vector quantization. Typical uses comprise image-processing algorithms, speech-recognition applications, and certain other types of pattern-recognition processes. GNG has not been applied in applications related to network optimization, and existing methods of network optimization do not generally optimize a network topology as a function of dynamic bandwidth utilization, regardless of a type of optimization algorithm used.

Although it is beyond the scope of this document to describe the inner workings of a GNG algorithm, the general operation of such an algorithm, as is known in the art, comprises:

i) Receive: i) a graph that contains a set of nodes connected by a set of edges; and ii) a set of additional input nodes determined by a probability-density function P ii) Randomly select an input node from P iii) Identify two existing nodes on the graph that are closest to the input node iv) Increment the age of each edge connected to the identified closest node v) Increment an error value associated with the identified closest node by the square of the distance between the closest node and the input node vi) Move the identified closest node (and all nodes directly connected to the closest node) closer to the input node vii) If the identified closest node and the identified second-closest node are not connected by an edge, create a new edge connecting the two. In either case, set the age of the edge connecting the two nodes to 0.

viii) Delete from the graph all edges from the graph that have an age that exceeds a threshold value. Delete any nodes that, as a result are no longer connected to an edge.

ix) After N iterations of steps ii-viii, select a first high-error existing node that has the highest error value and then select a second existing node that has the highest error value of any node connected to the first high-error existing node. Then remove the edge halfway between the two high-error nodes and add a new node and two new edges to the graph such that the two new edges connect the new node between the two high-error existing nodes. Then decrease the error value of the two high-error existing nodes.

x) Decrease the error value of all nodes of the graph by a constant multiplier.

xi) If a desired condition has not been satisfied, return to step ii and repeat.

Such a GNG algorithm requires input of constants and values that include the threshold error-age value, the probability-density function P, and the constant multiplier by which error values are decreased.

These constants and conditions may be selected by embodiment designers as a function of implementation-specific constraints, or may be chosen arbitrarily and fine-tuned over the course of repeated iterations of the present invention in order to tweak performance. If, for example, an implementation requires several thousand iterations to produce acceptable results, a designer may decrease an initial, arbitrarily chosen, value of the threshold error-age value such that old edges are deleted from the graph more often, thereby decreasing the number of iterations necessary to achieve a desired result at the risk of possibly requiring more extensive revisions to the network 201's existing topology.

Similarly, designers may initially choose an arbitrary value for other parameters of the GNG algorithm and adjust them after reviewing the results of running the algorithm with those initial values. In some cases, adjustments to the network itself, such as the addition of an application or a new user group, may require designers to compensate by adjusting some or all of the GNG algorithm's inputs.

Such adjustments and fine-tuning may be performed by methods known to persons skilled in the art, and may be performed as a further function of expert knowledge of a business, application, or user associated with the network 201 being optimized. In a typical case, such adjusting or fine-tuning may require revising a value of a single variable used by the GNG algorithm's calculations.

Probability density function P may also be identified as a function of expert knowledge or by other means known to those skilled in the art. Regardless of a manner in which P is identified, the goal of the probability density function is to identify variations in density among subsets of a coordinate space in which nodes of the graph are located. A function P may thus be created so as to identify a greater node density in areas to which existing nodes should migrate.

In one example, available network bandwidth may be selected by system designers as a parameter of the GNG algorithm. In such a case, regions of the virtual network 201 that have access to greater bandwidth would be assigned a greater probability density than would regions that have access only to low-bandwidth network segments. The result of this would be that the GNG algorithm would be more likely to randomly select a node (in step i) above) from the higher density regions identified by P. As a result, the algorithm would be more likely to migrate existing nodes toward that higher density region, resulting in a greater number of virtual machines migrating to regions of the network that have greater amounts of available bandwidth.

As will be described below, some embodiments of the present invention may identify a probability density function P as a function of multiple parameters, each of which is assigned a weighting.

Embodiments of the present invention may further comprise other elaborations of the GNG algorithm. Network entities represented by individual nodes or edges of the graph may be weighted to identify their relative importance, or to identify a relationship to a parameter associated with the probability density function P.

If, for example, P identifies node densities as a function of bandwidth availability, an existing node that uses a very large amount of bandwidth may be weighted such that it moves more rapidly to regions of higher probability density. In this way, virtual machines with higher bandwidth requirements have a greater likelihood of being migrated to a region of the network 201 that is capable of satisfying their bandwidth demands. Methods of revising the GNG algorithm to reflect such weighting may be done by the simple addition of weighting multipliers to the formulas of the GNG algorithm, using straightforward mathematical operations known to those skilled in the art. Although not described in detail here, may such variations are possible within the scope of the present invention, based on implementation details, financial, business, or technical constraints of the network or of the entities comprised by the network, or by a specific goal of a particular embodiment.

In one last example, if two virtual machines or applications are known to exchange very high-volume (or very frequent) network traffic, nodes or edges associated with those machines or applications may be weighted to increase the probability that they are relocated to (or kept in) a single, common POD, in order to avoid routing that traffic across multiple divisions of the network.

In some embodiments, these types of refinements may be performed in response to historical data or logged statistics associated with the virtual network. The two virtual machines described in the preceding paragraph, for example, may be identified by network statistics that reveal that the two machines have historically transferred a volume of data between themselves that is an order of magnitude higher than average. This tracked or stored data may be gathered by means known to those skilled in the art, such as by a hypervisor, physical network interfaces, or a network-management console. In some cases, an SNMP monitoring facility may continuously gather multiple types of statistics related to utilization, latency, or other network parameters, and forward this data to the present invention at scheduled times.

The result of performing a GNG algorithm iteratively upon the graph is thus to cause the nodes to migrate toward points identified by the probability-density function as having a higher probability density. Thus, if, in one example, P identifies 70 regions of a graph that each corresponds to one of 70 PODs of a virtual network, repetition of the GNG will reorganize nodes of the graph that correspond to virtual machines, such that the reorganized nodes more evenly distribute themselves into each POD. This reorganization will include deleting some or all old edges of the graph and reconnecting some or all nodes of the graph with newly created edges. This procedure will, by analogy, identify a new topology of the network in which some or all virtual machines, applications, or other network entities, are connected to different divisions of the network or to different sets of resources.

In embodiments of the present invention, such an algorithm may thus be performed upon a graph that represents nodes of a network in order to smooth out regions of greater or lesser bandwidth requirements. Repetitions of a method of the present invention may in this way reorganize a cloud topology to more evenly distribute resource requirements across regions, locations, PODs, or other divisions of the network. Because this method may be performed offline, by a cloud-optimizing module that is distinct from existing network-management facilities, embodiments of the present invention may not affect performance of the network itself.

Furthermore, because a GNG algorithm performs its steps many times, until it satisfies a desired state or condition, it may be thought of as a tool for stress-testing candidate network topologies. If, for example, designers wish to determine whether a proposed topology or other network revision would improve performance, a probability function that presumes this revision could be fed to a GNG algorithm in order to determine an effect of the revision. In one example, if network administrators wish to determine whether adding four new high-bandwidth PODs would alleviate current network congesting, they might perform a method of the present invention that has added those four PODs to an existing probability-density function. If that embodiment cannot derive a topology that satisfies a desired performance goal, then the administrators will have learned that merely adding four PODs cannot solve the current network-congestion problem.

Some embodiments of the present invention develop this analogy further by feeding a GNG algorithm with input parameters that represent virtual components, virtual infrastructure, bandwidth requirements, and patterns of network usage that have been determined at least in part by analysis of historical requirements and usage.

Embodiments may further enhance a standard operation of a GNG algorithm by associating a weighting to one or more input parameters or to instances of particular components (represented as nodes of a graph) or network connections between components (edges of the graph). If, for example, a first application is deemed to be mission-critical, edges that represent communication links between computers that run client or server modules of the application may be assigned a greater weight than would edges that connect infrequent, casual users.

Use of weighted or unweighted historical data to feed a GNG algorithm also allows embodiments of the present invention to be performed offline, without drawing resources from an active network-management or cloud-management apparatus or application.

An embodiment might periodically receive current performance and utilization data that identifies current bandwidth requirements of cloud components. The embodiment might then use this received data, possibly in conjunction with historical logs, to run the GNG algorithm offline. In either case, the embodiment would then forward a description of an optimized topology to a network-management resource capable of reconfiguring the cloud.

In some embodiments, this method could be implemented as a parallel process that runs concurrently or in near real-time, allowing a network-management resource to dynamically and automatically reconfigure or optimize a topology of all or part of a cloud-computing environment in response to dynamically changing network requirements of specific virtual components.

In summation, methods of the present invention may dynamically optimize a cloud-computing environment by redistributing virtual components and resources in order to equalize workloads across multiple divisions of the cloud. This is accomplished by representing the topology of the cloud as a graph, in which nodes represent virtualized resource-consuming entities deployed in the cloud and edges represent connections between those entities, and then identifying a more optimized topology as a function of revisions made to the graph by operation of a growing neural gas algorithm. This algorithm is extended by feeding it with parameters that represent, among other things, historical patterns of utilization of components of the cloud, and where those parameters are weighted to better represent relative importance of specific cloud components or resources.

The result is a mechanism for improving the operation of the computers that manage the cloud-computing platform, allowing them to continually or continuously optimize a topology of a cloud-computing environment in response to changes in bandwidth requirements of cloud components, where the optimization is performed within guidelines inferred from historical performance indicators and goals of the cloud's owner or administrator.

FIG. 1 shows a structure of a computerized system and computer program code that may be used to implement a method for automatic redistribution of virtual machines in accordance with embodiments of the present invention. In some embodiments, this system and code forms a cloud-optimization module or other network tool for optimizing a topology of a computer network that comprises virtualized resources. FIG. 1 refers to objects 101-119 and 201.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

The computer system 101 components of the computerized network-optimization module is further connected via a network or other communications mechanism known in the art to one or more network-monitoring tools 117 and to a network-management console, cloud-management platform, or other network-management means 119 known to those skilled in the art.

The network-monitoring tool 117 may monitor characteristics of a virtual network 201 in real time, in near-real time, periodically, on a prearranged schedule, or at other times that are determined as a function of implementation details of an embodiment of the present invention. In some cases, the network monitor 117 may log, store, or archive performance, efficiency, utilization, or other statistics gathered from the virtual network 201, and periodically forward this information to the computer system 101. In in other embodiments, the monitor 117 may forward such information to the computer system 101 as it is received, or shortly thereafter, regardless of whether the monitor 117 stores the information.

The network-management platform 119 is capable of determining how virtual machines or other virtualized resources may be deployed and configured on virtual network 201. In embodiments of the present invention, the optimization module of the present invention may receive information about a topology of the virtual network 201 from either a network monitor 117 or a cloud-management tool 119. In some cases, these two entities 117 and 119 may not be distinct or may overlap.

The optimization module of the present invention may then feed input based on this received information to an elaboration of a growing neural gas algorithm. The results of this procedure may suggest a more nearly optimized topology of the virtual network 201, and the optimization module would then forward this new topology to the network-management platform 119, which would then reconfigure virtual network 201 to conform to the new topology.

At least one memory device 105 contains stored computer program code 107, which is a computer program that comprises computer-executable instructions. The stored computer program code includes a program that implements a method for automatic redistribution of virtual machines in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for automatic redistribution of virtual machines.

Any of the components of the present invention could be created, integrated, hosted, maintained, deployed, managed, serviced, supported, etc. by a service provider who offers to facilitate a method for automatic redistribution of virtual machines. Thus the present invention discloses a process for deploying or integrating computing infrastructure, comprising integrating computer-readable code into the computer system 101, wherein the code in combination with the computer system 101 is capable of performing a method for automatic redistribution of virtual machines.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for automatic redistribution of virtual machines may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for automatic redistribution of virtual machines is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by the program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2A:
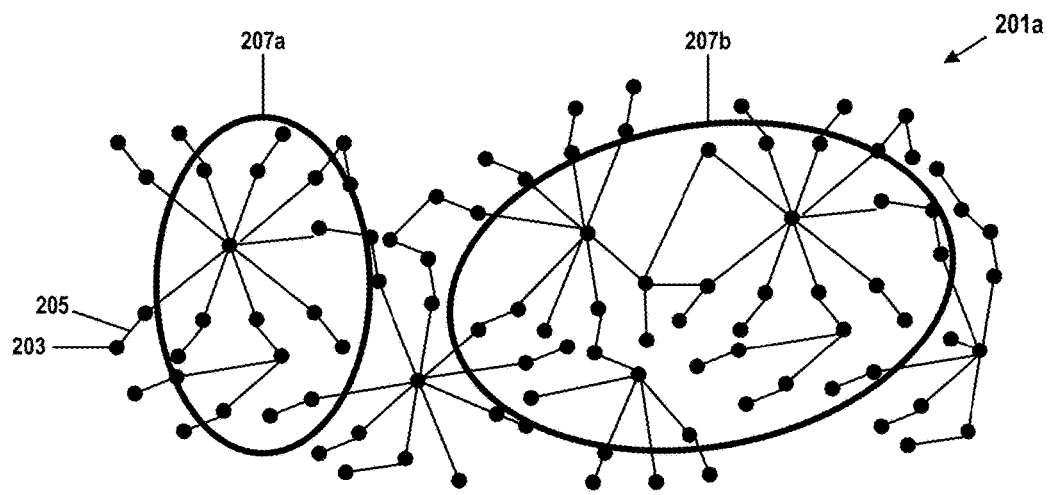
FIG. 2A shows details of an exemplary virtual network 201 that may be optimized by an embodiment of the present invention.

FIG. 2A shows details of an exemplary virtual network 201 that may be optimized by an embodiment of the present invention. FIG. 2A shows elements identified by reference numbers 201a-207b.

Reference number 201a shows FIG. 1's virtual network 201 in greater detail. Virtual network 201a is composed of virtualized resources each represented by a dot like the one identified by reference numeral 203. These resources may be virtual machines, other infrastructure components, or any other virtual resource of interest.

These resources 203 are connected in pairs by network connections represented here as lines like the one identified here by reference numeral 205. As will be shown in FIGS. 3 and 4, virtual network 201a may be represented as a graph in which each virtual resource 203 is represented as a node and each connection 205 between a pair of resources 203 is shown as an edge.

As described above, a network may be organized hierarchically into divisions, such as regions, locations, or PODs. In FIG. 2A a partial example of such a hierarchical is shown as "locations" 207a and 207b. Here, some nodes fall within the S-shaped boundary of first location 207a, some fall within the rectangular boundary of second location 207b, and some fall outside of either location, presumably occupying other locations not shown here.

In other examples, 207a and 207b may represent combinations of other types of divisions, such as a region, a POD, a subnetwork served by one or more network backbones, a virtual local-area network, a subset of an enterprise network, a server farm, or some other logical or physical division of a virtualized network 201a.

In more general embodiments, 207a and 207b may represent divisions that do not each directly correspond to subnetworks. In one example, each division, of which 207a and 207b might represent two of many, could represent an available amount of a network-bandwidth resource, such as a network point of presence. In a variation of such embodiments, each division might represent a fixed amount of bandwidth, as in the case where each point of presence is configured to make available a standard amount of bandwidth.

In such embodiments, a goal of the present invention might be to evenly redistribute virtual machines, applications, or other bandwidth-consuming entities such that each bandwidth demands upon each division are more equivalent.

In all cases, the present invention will use a growing neural gas algorithm to revise a graph (which represents a topology of a virtual network 201) by generating new sets of edges (which represent network connections) in order to more optimally organize nodes (which represent network entities like virtual machines). In examples described below, this more optimal organization may better match bandwidth-consuming virtual machines or applications to the capacities of bandwidth sources, such as a POD. But in a more general case, the method of the present invention may be adapted to more optimally organize any type of network entities to better satisfy any sort of desirable network-related condition.

For this reason, some embodiments of the present invention may be considered heuristic rather than optimizing. That is, they generate a more nearly optimized topology that merely satisfies a set of threshold, "acceptable," conditions (such as ensuring that bandwidth demands across a network fall within a certain range), rather than seeking to discover an optimal, or best possible, topologies. In such embodiments, this approach may be far more efficient because of the constantly fluctuating nature of a large virtual network's bandwidth characteristics and because the complexity of such a network would require far greater effort to fully optimize.

Here, some nodes 203 may require far more resources than other nodes 203. If, for example, location 207b comprises only one node that requires a relatively large amount of network bandwidth, a first network backbone that serves location 207b might be underutilized. Conversely, if location 207a is served by a second network backbone of similar capacity and comprises a larger proportion of high-bandwidth nodes, then the second network backbone may be overwhelmed by the demands of its virtual machines 203.

In this example, location 207a might not provide acceptable response time to its users and location 207b might underutilize the network bandwidth available to it. Neither condition represents an efficient use of resources.

Figure 2B:
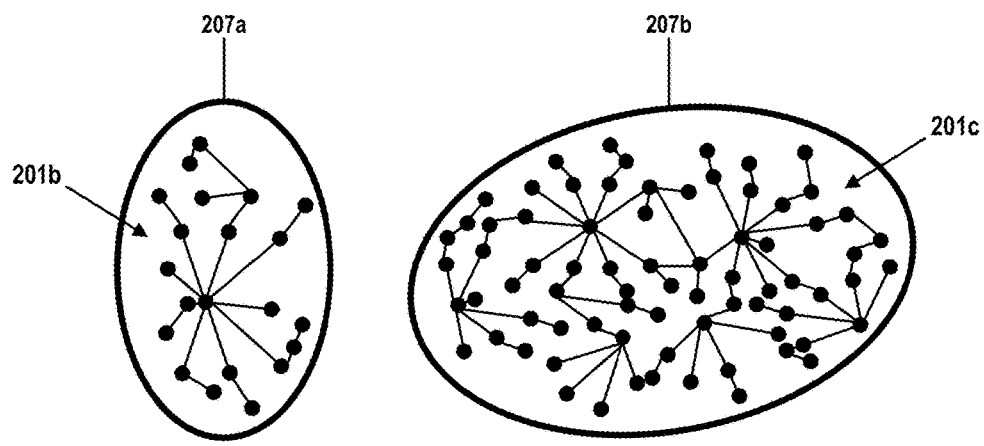
FIG. 2B shows an example of FIG. 2A's virtual network 201a that has been optimized by an embodiment of the present invention.

FIG. 2B shows an example of FIG. 2A's virtual network 201a that has been optimized by an embodiment of the present invention. FIG. 2B shows elements identified by reference numbers 201b-207b.

Here, virtual network 201a has been split into two virtual networks 201b and 201c. The topology of these networks 201b and 201c is significantly different than that of original network 201a. Although 201b and 201c may comprise the same virtualized components 203, those components have here been reorganized by an embodiment of the present invention into a different, more nearly optimized, topology. This reorganization may have been accomplished by replacing some or all of the connections 205 of FIG. 2A with a new set of connections.

In FIG. 2B, different subsets of virtual network 201a are now split between first location 207a and second location 207b. This splitting may have been performed such that second location 207b now contains a higher number of higher-bandwidth virtual machines. In this way, a topology of virtual network 201a has been revised to decrease the aggregate demand for bandwidth from the previously overloaded network backbone of first location 207a and to increase the aggregate demand for bandwidth from the previously underutilized network backbone of second location 207b. The resulting optimized topology makes more efficient use of available network resources.

In some embodiments, this reorganization may be performed repeatedly, in response to each update to performance or efficiency statistics collected by one or more network-monitoring tools 117. Such embodiments may thus automatically and dynamically optimize a topology of virtual network 201 in response to varying network-bandwidth demands.

Figure 3A:
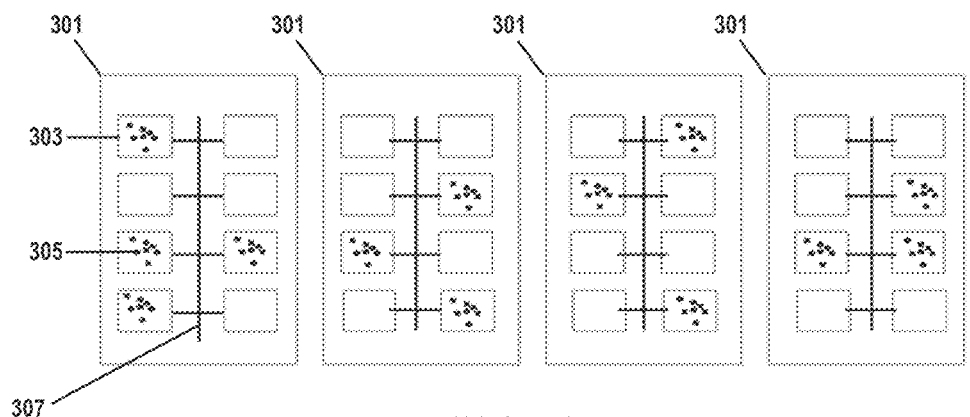
FIG. 3A shows in greater specificity an exemplary virtual network that may be optimized by an embodiment of the present invention.

FIG. 3A shows in greater specificity an exemplary virtual network that may be optimized by an embodiment of the present invention. FIG. 3A shows elements identified by reference numbers 301-307.

In this example, a virtual network, like network 201 shown in in FIG. 1 or 201a shown in FIG. 2A, is divided into a set of "locations" 301. Each location contains a set of "points of delivery" (or "PODs") 303 that are connected by a network infrastructure 307. Although not shown in the figure, locations 301 may further be connected to each other or to a common backbone, by other network connections.

Figure 3B:
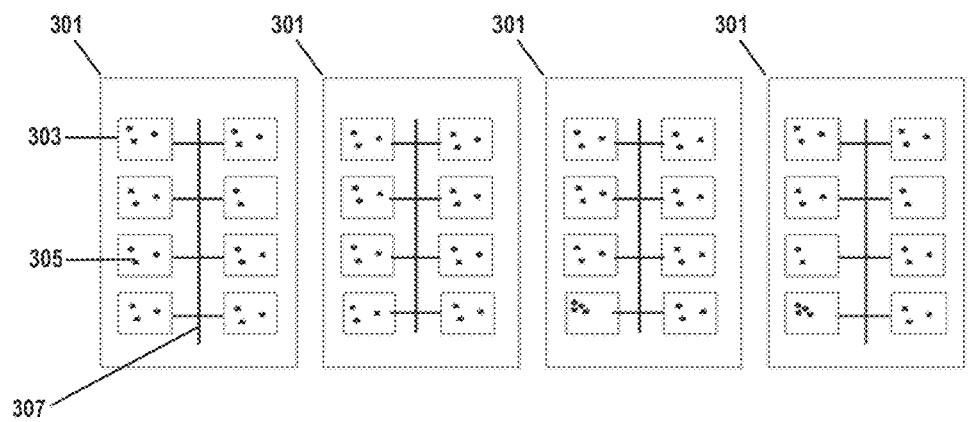
FIG. 3B shows an example of FIG. 3A's virtual network that has been optimized by an embodiment of the present invention.

In the example of FIGS. 3A and 3B, each POD 303 contains zero or more network entities 305 that will be represented by nodes of a graph optimized by a GNG algorithm. In the examples shown here, these entities 305 are virtual machines of a virtualized network, such as a cloud-computing network. In a general case, a virtual network 201 may comprise any number of locations 301, a location 301 may comprise any number of PODs 303, and a POD 303 may comprise other combinations of network entities 305, such as an application running on a virtual machine. An embodiment of the present invention may be applied to many other types of network entities, as a function of implementation details and goals of the embodiment's designer.

As described above, embodiments of the present invention may act upon networks that comprise other methods of organizing resources. A virtual network 201 may, for example, comprise regions that in turn comprise locations.

In the example of FIG. 3A, it can be seen that a number of entities 305 comprised by each POD 303 may vary considerably. While no virtual machines may as yet be deployed in some PODs, other PODs may comprise several or many virtual machines.

Similarly, although FIGS. 3A and 3B show eight PODs 303 per location 301, in a general case, each location may comprise a different number of PODs.

Examples discussed herein describe optimization of network topology at the entity 305 level. That is, the exemplary embodiments discussed here optimize a distribution of entities 305, such as virtual machines.

In a more general case, however, an embodiment might instead be applied at a different hierarchical level of a virtual network 201, or at multiple levels. An embodiment might, for example, be used to optimize connections among, and organizations of, locations 301 within regions of the virtual network 201, or might be used to simultaneously or concurrently optimize connections and organizations of a combination of locations 301 within regions, PODs 303 within one or more locations 301, and of entities 305 within a combination of regions, locations 301, and PODs 303. In each case, the optimization method described herein is merely applied to different sets of optimizable items that may be represented as nodes of a graph.

FIG. 3B shows an example of FIG. 3A's virtual network that has been optimized by an embodiment of the present invention. FIG. 3B shows elements identified by reference numbers 301-307.

Items 301-307 of FIG. 3B represent items that are analogous in form and function to similarly numbered items of FIG. 3A. Here, it can be seen that, after a performance of a method of the present invention has been applied to virtual machines 305 of FIG. 3A, the virtual machines 305 have been redistributed more evenly among PODs 303. This redistribution is intended to equalize loads among locations 301.

This simplified example assumes that each location 301 is served by network resources that provide similar amounts of bandwidth to each location 301, and that each virtual machine or application 305 requires a similar amount of bandwidth or other network resources. Thus the redistribution shown here allocates similar numbers of entities 305 to each POD 303.

In a more general case, however, a more nearly optimized topology might locate very different numbers of virtual machines in each POD. This might occur if, for example, some PODs 303 have access to greater amounts of bandwidth or other network resources than do others, or if some virtual machines 305 require greater amounts of bandwidth or other network resources than do others.

In all cases, a goal of an embodiment is to revise a virtual network's topology such that demand for some network resource is more nearly equalized across the network. Entity groups that, for example, have similar aggregate bandwidth requirements might each be relocated to a POD 303 of a set of PODs that each has access to a similar bandwidth resource. Thus, even though each POD 303 may comprise a different number of virtual machines 305, the distribution of the virtual machines 305 would be selected so as to keep a degree of utilization of each POD's network resources as similar as possible.

Figure 4:
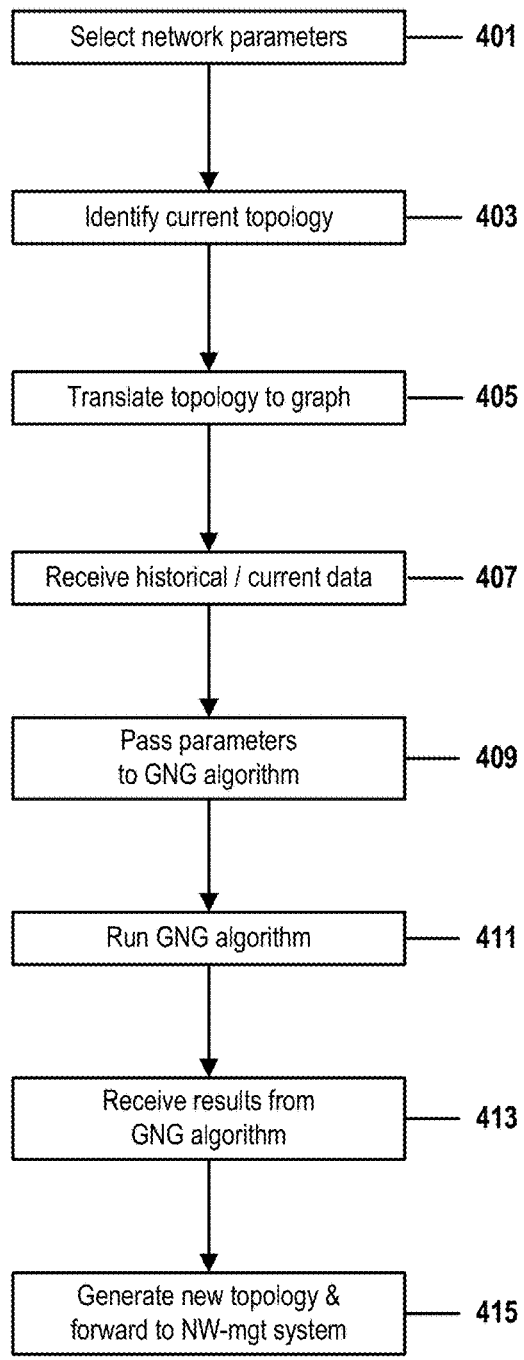
FIG. 4 is a flow chart that shows a method for automatic redistribution of virtual machines in accordance with embodiments of the present invention.

FIG. 4 is a flow chart that shows a method for automatic redistribution of virtual machines in accordance with embodiments of the present invention. FIG. 4 comprises steps 401-415.

In step 401, a cloud-optimization module similar to the system of FIG. 1 selects one or more network parameters. These parameters may measure any combination of characteristics of a network, such as a virtual machine's bandwidth utilization; a ratio of a virtual machine's current resource utilization relative to an amount of data received by the virtual machine from the network; an application's bandwidth requirements; an amount of bandwidth required by a pair of applications in order for those applications to communicate with each other; a pattern or quantity of network usage associated with a physical or logical location; a pattern or quantity of network usage associated with one or more users; an available capacity of a parameter associated with a virtual machine; an amount of available bandwidth associated with a particular network resource; a class of service associated with an application; a cost-of-service or quality-of-service associated with a particular network resource; other characteristics related to consumption of network resources; and functions of combinations of such characteristics.

Embodiments of the present invention shown in FIG. 4 limit selection these parameters and, in some cases, to parameters directly related to network bandwidth utilization parameters.

In the example of FIG. 4, an embodiment might in step 401 select five such parameters:

(i) a number of TCP connections between a pair of virtual machines 305;

(ii) an amount of bandwidth required for normal communication between a pair of applications, where at least one of those applications runs on a virtual machine 305 of the virtual network 201;

(iii) an amount of network traffic at a location 301;

(iv) an amount of network utilization of a user or of a group of users; and (v) a number of TCP connections between a pair of virtual machines 305, divided by a total number of TCP connections between a first virtual machine of the pair of virtual machines 305 and all other virtual machines 305 of the network 201.

Many other combinations are possible, based on implementation-dependent details, business, financial, or technical constraints, a user or network characteristic, or a goal or intent of an embodiment.

In step 403, the cloud-optimization module identifies a current topology of the virtual network 201. This identification may be performed by means known to those skilled in the art as a function of information provided to the module by a user or by a network-monitoring or logging tool 117 or network-management resource 119.

In embodiments that comprise repeated, iterative performances of the method of FIG. 4, the cloud-optimization module may already be aware of the current network topology, as generated by the cloud-optimization module itself during a previous iteration of the method of FIG. 4. In some cases, even if the module had previously suggested a topology to a network-management resource 119, the module may request confirmation from another entity (such as the monitor 117 or network manager 119) that its previously suggested topology has indeed been deployed.

In step 405, the cloud-optimization module translates the network topology received in step 405 into a graph, wherein each node of the graph represents an entity 305 of virtual network 201 and each edge of the graph that connects two nodes represents a virtual network connection between two entities 305 that are represented respectively by the two nodes. This translation may be performed by straightforward means known to those skilled in the art.

In step 407, the cloud-optimization module receives data from the network-monitoring tool 117 that comprises values of the selected parameters associated with specific entities 305 or network connections 307 of virtual network 201.

As described above, these values may represent a current, recent, or historical state or value of a characteristic of the virtual network 201, or combinations thereof. If, for example, values of one user's amount of network utilization are received, those received values may identify: the user's current amount of bandwidth consumption, as gathered by a real-time network-management or network-monitoring facility 117; the user's most recent amount of bandwidth consumption, as gathered by one or more most recent operations of a real-time network-management or network-monitoring or logging facility 117; the user's historical patterns of bandwidth consumption as logged or stored by a network-monitoring tool 117, a network-management resource 119, or by the cloud-optimization module itself or some combination thereof.

In step 409, the cloud-optimization module runs a GNG algorithm in order to determine weightings for each of the parameters selected in step 401. These weightings will determine adjustments to the directed graph that will represent a new topology of step 415, in which virtual machines will have been redistributed as a growing neural gas.

In step 411, the cloud-optimization module performs steps of a growing neural gas algorithm. As mentioned earlier, GNG algorithms and methods of implementing and running them are known in the art. In this step, the GNG algorithm may be initialized by any standard method known in the art.

In some embodiments, for example, the GNG algorithm, or the entire method of FIG. 6, may be run repeatedly or continuously, with each iteration inheriting a state identified by the previous iteration. In some embodiments, a first (or only) iteration may be initialized by distributing networked entities, nodes, or virtual machines 305 randomly across PODs 303 or locations 301, thus allowing the GNG to be initialized with a random probability distribution.

In embodiments in which the GNG algorithm, or the entire method of FIG. 6, is run iteratively or continuously, every iteration GNG may produce a new graph that is different from one generated by an immediately preceding iteration. Each successive graph represents a further, and more closely optimal, redistribution of networked entities, nodes, or virtual machines 305 across PODs 303 as a function of adjustments to weighting coefficients of equations solved by the GNG algorithm. These adjustments to the weighting coefficients as a function of solving the GNG equations is an operation of the GNG algorithm that is known in the art.

In step 413, the cloud-optimization module receives the results of the GNG algorithm. This output will, as a function of the adjustments to the weightings, and other parameters manipulated by the GNG algorithm by means of operations known in the art, identify nodes and edges of a revised graph. As described above, this revised graph may be interpreted as representing a redistributed network topology in which networked entities, nodes, or virtual machines 305, and the network connections among them, are more efficiently or consistently allocated across divisions of the virtual network 201.

In step 415, the cloud-optimization module translates the results of the GNG, by methods known in the art, into a topological or other representation of the redistributed network that may be understood by a network-management facility 119 as representing a revised topology of the virtual network 201. The module then communicates this translated information to the management facility 119, where it may be used by facility 119 to redeploy or reconfigure entities 305 of virtual network 201, in compliance with the communicated translated information. This redeployment or reconfiguration may be performed as an implementation-dependent operation according to any method known in the art.

As mentioned above, in some embodiments, the GNG algorithm, steps 403-415, or the entire method of FIG. 4 may be repeated periodically or continuously in order to dynamically and automatically optimize a topology of all or part of virtual network 201. In some cases, different parameters may be selected in step 401 in response to time-varying characteristics of virtual network 201 or a component of virtual network 201, or in response to changes in an implementation-dependent detail, a business, financial, or technical constraints, a user or network characteristic, or a goal or intent of an embodiment.

In particular, in such embodiments, each iteration may redistribute entities, nodes, or virtual machines 305 as a function of a most current set of values of the parameters passed to the GNG algorithm in step 409, where that most current set of values are derived as a function of updated historical or current data received in step 407. Thus, in such embodiments, each iteration continues to automatically fine-tune the network topology in response to the network's most recent usage patterns.

In some cases, iterations of the method of FIG. 4 may be performed such that successive iterations optimize network 201 as functions of different preselected sets of parameters. A first iteration might, for example, be performed to optimize network bandwidth consumption of virtual machines in one region of the network 201, and a second iteration then performed to optimize deployment of software applications so as to minimize user bandwidth requirements aggregated on each network-backbone segment.

What is claimed is:

1. A cloud-provisioning system comprising a processor, a memory coupled to the processor, a computer-readable hardware storage device coupled to the processor, a network monitor, and an interface to a network-administration mechanism, the storage device containing program code configured to be run by the processor via the memory to implement a method for automatic reprovisioning of virtual infrastructure components of a virtual network, the method comprising:

the cloud-provisioning system selecting a set of network parameters, wherein each parameter of the set of network parameters identifies one or more performance characteristics of the virtual network;

the cloud-provisioning system representing a current topology of the virtual network as a graph, wherein the graph represents a component of the virtual network as a node and a connection between two components of the virtual network as an edge connecting two nodes that represent the two components;

the cloud-provisioning system receiving via the network monitor information that identifies a set of network-utilization figures, wherein each figure of the set of network-utilization figures identifies an amount of network resources used by one component of the set of virtual components;

the cloud-provisioning system associating a weighting with each parameter of the set of network parameters as a function of the received network-utilization figures, wherein the associating comprises:

the cloud-provisioning system launching a growing neural gas algorithm in order to generate a new topology of the virtual network, wherein the new topology identifies a new set of connections between pairs of virtual infrastructure components of the set of virtual components and wherein the new topology provides optimized bandwidth utilization; and the cloud-provisioning system optimizing the virtual network by provisioning and reprovisioning the pairs of virtual infrastructure components of the virtual network, as a function of the weighted parameters and the current utilization information, such that the virtual infrastructure components conform to the new topology.

2. The cloud-provisioning system of claim 1, wherein each parameter of the set of network parameters is selected from a group comprising:

a ratio of: i) a number of TCP connections between a pair of virtual machines, and ii) a total number of TCP connections between a first virtual machine of the pair of virtual machines and all other virtual components of the virtual network, a ratio of a virtual machine's current utilization relative to an amount of network data requested from the virtual machine, an amount of bandwidth required by a pair of applications in order for the applications to communicate with each other over the virtual network, wherein at least one application of the pair of applications runs on the virtual network, an amount of network utilization associated with each physical or logical location of a subset of the set of virtual components, an amount of network utilization associated with each user of the virtual network, and an amount of network utilization associated with a user of the virtual network.

3. The cloud-provisioning system of claim 1, wherein the launching a growing neural gas algorithm comprises:

the cloud-provisioning system initializing a growing neural gas algorithm with values of each parameter of the set of network parameters; and the cloud-provisioning system passing a mathematical representation of the graph to the growing neural gas algorithm.

4. The cloud provisioning system of claim 1, wherein each node of the graph represents a network entity selected from the group consisting of: a virtual machine; a software application installed in the virtual network, and an other component of a virtual infrastructure.

5. The cloud-provisioning system of claim 1, wherein the received information received via the network monitor comprises a log of network utilization statistics associated with one or more components of the virtual network.

6. The cloud-provisioning system of claim 1, wherein the topology of the virtual network organizes the set of virtual components of the virtual network into a hierarchical structure of one or more regions that each comprise one or more locations of a set of locations, wherein each location of the set of locations comprises one or more points of delivery of a set of points of delivery, and wherein each point of delivery of the set of points of delivery comprises one or more virtual components of the set of virtual components.

7. A method for automatic reprovisioning of virtual infrastructure components of a virtual network, the method comprising:

a cloud-provisioning system selecting a set of network parameters, wherein each parameter of the set of network parameters identifies one or more performance characteristics of the virtual network;

the cloud-provisioning system representing a current topolog of the virtual network as a graph, wherein the graph represents a component of the virtual network as a node and a connection between two components of the virtual network as an edge connecting two nodes that represent the two components;

the cloud-provisioning system receiving via the network monitor information that identifies a set of network-utilization figures, wherein each figure of the set of network-utilization figures identifies an amount of network resources used by one component of the set of virtual components;

the cloud-provisioning system associating a weighting with each parameter of the set of network parameters as a function of the received network-utilization figures, wherein the associating comprises:

the cloud-provisioning system launching a growing neural gas algorithm in order to generate a new topology of the virtual network, wherein the new topology identifies a new set of connections between pairs of virtual infrastructure components of the set of virtual components and wherein the new topology provides optimized bandwidth utilization; and the cloud-provisioning system optimizing the virtual network by provisioning and reprovisioning the pairs of virtual infrastructure components of the virtual network, as a function of the weighted parameters and the current utilization information, such that the virtual infrastructure components conform to the new topology.

8. The method of claim 7, wherein each parameter of the set of network parameters is selected from a group comprising:

a ratio of: i) a number of TCP connections between a pair of virtual machines, and ii) a total number of TCP connections between a first virtual machine of the pair of virtual machines and all other virtual components of the virtual network, a ratio of a virtual machine's current utilization relative to an amount of network data requested from the virtual machine, an amount of bandwidth required by a pair of applications in order for the applications to communicate with each other over the virtual network, wherein at least one application of the pair of applications runs on the virtual network, an amount of network utilization associated with each physical or logical location of a subset of the set of virtual components, an amount of network utilization associated with each user of the virtual network, and an amount of network utilization associated with a user of the virtual network.

9. The method of claim 7, wherein the launching a growing neural gas algorithm comprises:

the cloud-provisioning system initializing a growing neural gas algorithm with values of each parameter of the set of network parameters; and the cloud-provisioning system passing a mathematical representation of the graph to the growing neural gas algorithm.

10. The method of claim 7, wherein each node of the graph represents a network entity selected from the group consisting of: a virtual machine, a software application installed in the virtual network, and an other component of a virtual infrastructure.

11. The method of claim 7, wherein the received information received via the network monitor comprises a log of network utilization statistics associated with one or more components of the virtual network.

12. The method of claim 7, wherein the topology of the virtual network organizes the set of virtual components of the virtual network into a hierarchical structure of one or more regions that each comprise one or more locations of a set of locations, wherein each location of the set of locations comprises one or more points of delivery of a set of points of delivery, and wherein each point of delivery of the set of points of delivery comprises one or more virtual components of the set of virtual components.

13. The method of claim 7, further comprising providing at least one support service for at least one of creating, integrating, hosting, maintaining, and deploying computer-readable program code in the computer system, wherein the computer-readable program code in combination with the computer system is configured to implement the selecting, representing, receiving, associating, launching, and optimizing.

14. A computer program product, comprising a computer-readable hardware storage device having a computer-readable program code stored therein, the program code configured to be executed by a cloud-optimization module comprising a processor, a memory coupled to the processor, a computer-readable hardware storage device coupled to the processor, a network monitor, and an interface to a network-administration mechanism, the storage device containing program code configured to be run by the processor via the memory to implement a method for automatic reprovisioning of virtual infrastructure components of a virtual network, the method comprising:

a cloud-provisioning system selecting a set of network parameters, wherein each parameter of the set of network parameters identifies one or more performance characteristics of the virtual network;

the cloud-provisioning system representing a current topology of the virtual network as a graph, wherein the graph represents a component of the virtual network as a node and a connection between two components of the virtual network as an edge connecting two nodes that represent the two components;

the cloud-provisioning system receiving via the network monitor information that identifies a set of network-utilization figures, wherein each figure of the set of network-utilization figures identifies an amount of network resources used by one component of the set of virtual components;

the cloud-provisioning system associating a weighting with each parameter of the set of network parameters as a function of the received network-utilization figures, wherein the associating comprises:

the cloud-provisioning system launching a growing neural gas algorithm in order to generate a new topology of the virtual network, wherein the new topology identifies a new set of connections between pairs of virtual infrastructure components of the set of virtual components and wherein the new topology provides optimized bandwidth utilization; and the cloud-provisioning system optimizing the virtual network b provisioning and reprovisioning the pairs of virtual infrastructure components of the virtual network, as a function of the weighted parameters and the current utilization information, such that the virtual infrastructure components conform to the new topology.

15. The computer program product of claim 14, wherein each parameter of the set of network parameters is selected from a group comprising:

a ratio of: i) a number of TCP connections between a pair of virtual machines, and ii) a total number of TCP connections between a first virtual machine of the pair of virtual machines and all other virtual components of the virtual network, a ratio of a virtual machine's current utilization relative to an amount of network data requested from the virtual machine, an amount of bandwidth required by a pair of applications in order for the applications to communicate with each other over the virtual network, wherein at least one application of the pair of applications runs on the virtual network, an amount of network utilization associated with each physical or logical location of a subset of the set of virtual components, an amount of network utilization associated with each user of the virtual network, and an amount of network utilization associated with a user of the virtual network;

and wherein wherein the launching a growing neural gas algorithm comprises:

the processor initializing a growing neural gas algorithm with values of each parameter of the set of network parameters; and the processor passing a mathematical representation of the graph to the growing neural gas algorithm.

16. The computer program product of claim 14, wherein the received information received via the network monitor comprises a log of network utilization statistics associated with one or more components of the virtual network.

* * * * *